Sept. 13, 1938.  M. OLLEY  2,130,288
AUTOMOBILE SUSPENSION SYSTEM
Filed July 17, 1935  2 Sheets-Sheet 1
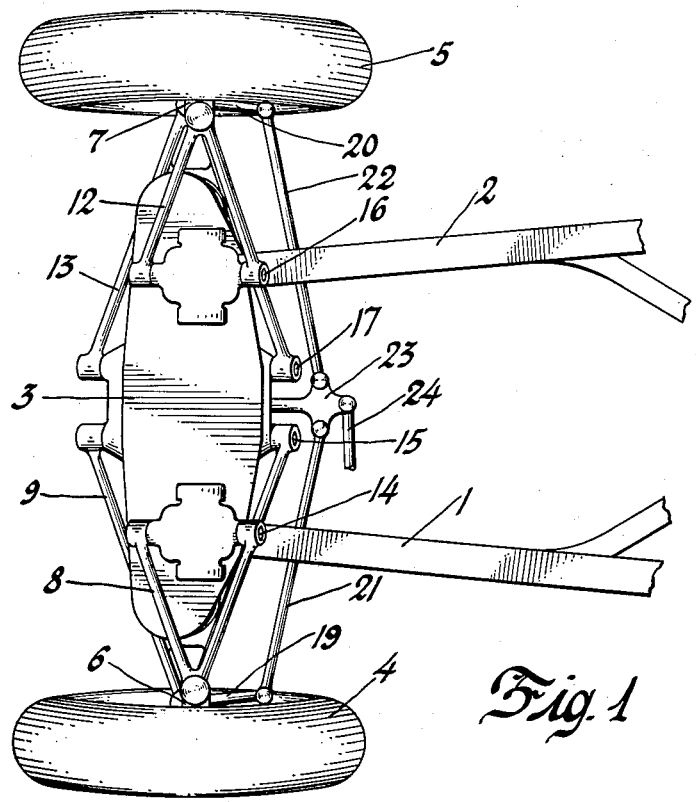
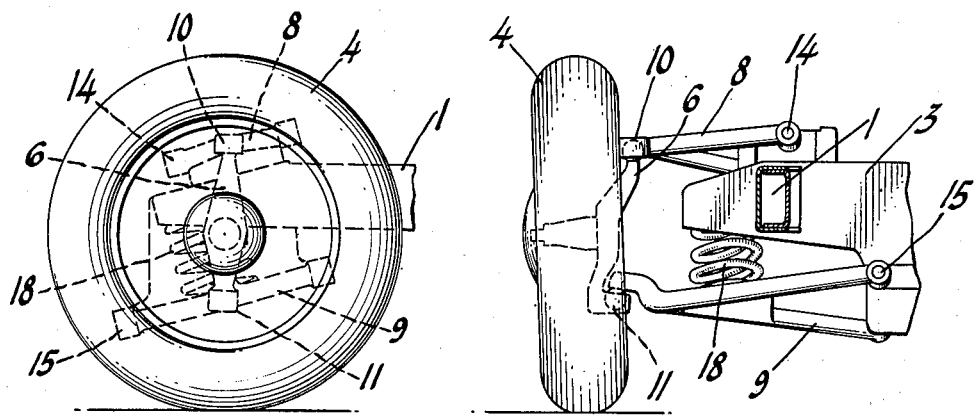
Fig. 1
Fig. 2  Fig. 3
Inventor
Maurice Olley
By Blackmore, Spencer & Flint
Attorneys Inventor
Maurice Olley
By Blackmore, Spencer & Flint
Attorneys Patented Sept. 13, 1938

2,130,288

UNITED STATES PATENT OFFICE 2,130,288

AUTOMOBILE SUSPENSION SYSTEM

Maurice Olley, Detroit, Mich., assignor to General Motors Corporation, Detroit, Mich., a corporation of Delaware Application July 17, 1935, Serial No. 31,830

4 Claims. (Cl. 280—124)

This invention relates to vehicles having independent suspension of the road wheels of that type in which each road wheel is resiliently supported from the vehicle frame at the outer end of a laterally extending arm or linkage which is pivoted to the frame of the vehicle so as to be capable of deflection in a generally upward and downward direction, in a plane transverse to the longitudinal axis of the vehicle, suitable spring means being provided to resiliently restrain upward swinging movement of the arm or linkage relatively to the vehicle frame.

More particularly, the invention relates to motor vehicles having independent suspension of the dirigible road wheels of the foregoing general type, in which the pivoted arm or linkage for each road wheel is constituted by a pair of laterally extending links which are pivoted one above the other to the frame of the vehicle, and between the outer ends of which a wheel supporting member is pivotally mounted.

In suspensions of the foregoing character, application of the brakes normally results in a diving of the front end of the vehicle, or a deflection thereof towards the road, due to the forward transfer of the mass of the vehicle from the rear to the front of the car, consequent upon deceleration. The converse effect resulting in a lifting of the front end of the vehicle relative to the road, occurs upon deceleration, when the brakes are applied when the vehicle is going backwardly or in a rearward direction.

Normally, the laterally extending links are pivoted about axes parallel to the ground, and when at the same time these axes are parallel to the longitudinal axis of the vehicle, and the wheel is deflected relatively to the vehicle, an assumed fixed point on the wheel, e. g., the point of contact of the tire with the road, is deflected relatively to the vehicle, in a vertical plane normal to the longitudinal axis of the vehicle.

The downward "dive" or upward "lift" of the front end of the vehicle, relative to the road, consequent upon braking deceleration of the car in forward or rearward directions respectively, is in either case equal for a given rate of deceleration. (The degree of "dive" or "lift" obviously varies as the rate of deceleration, other things being equal.)

The object of the invention is to reduce the extent to which a vehicle having the aforesaid general type of independent suspension of a pair of road wheels, dives or lifts relatively to such independently suspended road wheels or to the road, upon braking deceleration in one or both directions of motion of the vehicle.

It is a more specific object of the invention to reduce the degree of "dive" or downward deflection of the front end of a vehicle, having the aforesaid type of independent suspension of the dirigible front wheels, upon braking deceleration when the vehicle is going forwardly.

A still further object of the invention is to effect the last named object with a construction in which the caster angle of the dirigible road wheels remains constant regardless of the deflection of the road wheels relatively to the vehicle.

The above and other objects of the invention will be apparent as the description proceeds.

It has been found that the vertical extent of diving or lifting of the ends of the vehicle can be very considerably reduced in magnitude, at least in one direction of deceleration and to a lesser extent in both directions of deceleration, when upon any relative deflection of the wheel and the vehicle frame, the wheel is constrained to move along a line extending at an angle outwardly and upwardly away from the vertical plane of the center of gravity of the vehicle. This is so because the decelerating force acting longitudinally of the vehicle gives rise to a force component opposing the force tending to cause the diving or lifting deflection. It will later be shown that by suitable selection, the angle can be such that there is neither an upward nor a downward deflection of one or both ends of the vehicle in one direction of maximum deceleration (e. g. in forward braking), assuming a given constant coefficient of rolling friction of the tire on the road.

According to the invention, the required direction of movement of the point of contact of the tire with the road upon an upward deflection of the wheel relatively to the vehicle, is obtained by inclining the pivot axis or axes for the arms or links on the frame in a non-horizontal relationship thereto, at an angle outwardly and downwardly from the vertical transverse plane of the center of gravity of the vehicle.

The drawings show one example of a construction according to the invention applied to the front dirigible wheels of a motor vehicle. In this case the pivot axes of the links slope downwardly towards the front end of the vehicle.

In the drawings:—

Figure 1 shows in plan view, the front end of a motor vehicle chassis with independent suspension of the dirigible road wheels according to the invention.

Figure 2 is a side elevation.

Figure 3 is an end elevation of Figure 2.

Figure 4:
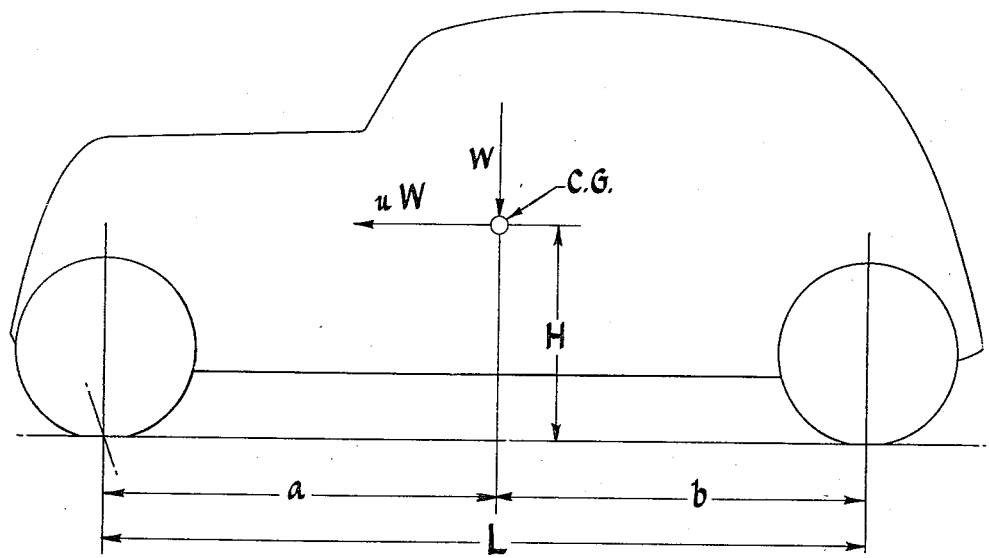
Figures 4 and 5 are diagrammatic views showing the factors involved in the upward or downward movement of the front end of the vehicle relatively to the wheels as a result of braking deceleration.

In Figures 1, 2 and 3, I and 2 are the side members of the frame which is provided with a cross member 3.

The dirigible road wheels 4 and 5 are each carried on wheel supporting members 6 and 7 respectively.

The wheel supporting member 6 is mounted between the outer ends of a pair of laterally extending links 8 and 9 through the medium of ball and socket connections 10 and 11 respectively.

The wheel supporting member 7 is similarly mounted between a pair of laterally extending links 12 and 13.

The links 8, 9 and 12, 13 are V-shaped in plan and those of each pair are pivoted one above the other to the frame about parallel axes 14, 15 and 16, 17 respectively, which are inclined downwards towards the front end of the vehicle, (as seen most clearly in Figure 2).

Coil springs such as 18 interposed between the frame cross member 3 and the links 9 and 13 respectively, resiliently restrain swinging movement of the linkages in a direction upwardly and forwardly relatively to the frame.

The wheel supporting member 6 is provided with a steering arm 19 and the wheel supporting member 7 is provided with a steering arm 20. Tie rods 21 and 22 respectively connect the arms 19 and 20 to a T headed lever 23 which is moved in known manner by the drag link 24 connected to a steering gear (not shown) to effect a turning of the wheel supporting members 6 and 7 about axes passing through the centers of their ball and socket connections to the links 8, 9 and 12, 13 respectively, and hence dirigible movement of the wheels 4 and 5.

The center of the ball and socket connections between the wheel supporting member 6 and its supporting links 8 and 9 are so arranged in relation to each other that the wheel supporting member has the requisite "caster" angle.

At all times during deflection of the wheel relatively to the vehicle frame, the wheel supporting members move parallel to themselves in planes parallel to the longitudinal axis of the vehicle so that the "caster" angle remains constant.

Figure 5:
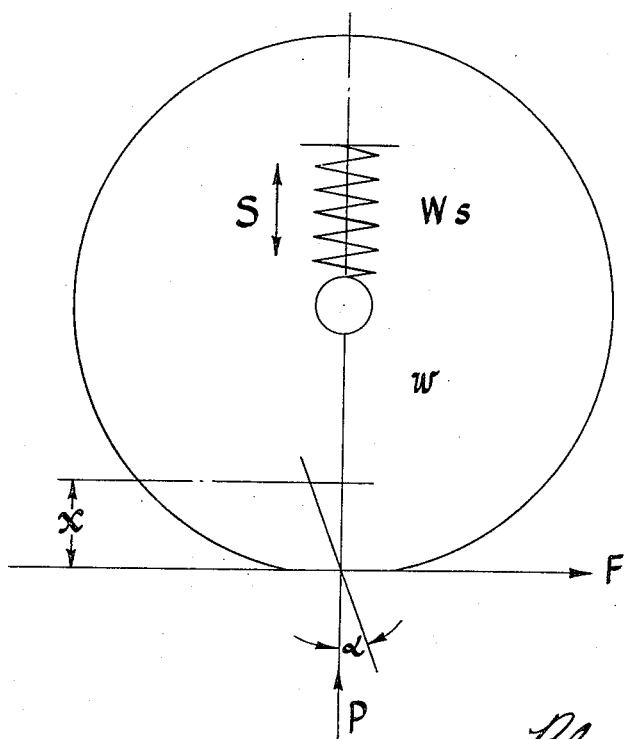

Referring now to Figures 4 and 5,

If $x$ = the distance which the wheel lifts or drops relatively to the vehicle, $S$ = the spring rate of both wheels combined (assumed constant), $Ws$ = spring load on the wheels, $F$ = the tractive force, $P$ = the tire contact load, $w$ = the unsprung weight, $\alpha$ = the angle which the path of movement of a fixed point on the tire makes with the vertical in a plane parallel to the longitudinal axis of the vehicle, as the wheel lifts or drops relatively to the vehicle, $u$ = the coefficient of rolling friction, $W$ = the weight of the car, $uW$ = the deceleration force, $H$ = the height from the ground of the center of gravity, $L$ = the wheelbase, $a$ = distance between the transverse vertical planes of the front wheels and the center of gravity, $b$ = distance between the transverse vertical planes of the rear wheels and the center of gravity.

Because the force F is not normal to the path of movement of a fixed point on the tire (which path of movement, makes an angle $\alpha$ with the vertical), there is a vertical force component thereof acting downwardly on the wheel in forward braking and upwardly in rearward braking. The value of this component is obviously $F \tan \alpha$ and the total vertical downward load at the point of tire contact in forward braking is therefore $Ws + w + F \tan \alpha$.

Therefore at all times in forward braking $P - (Ws + w) = F \tan \alpha$.

but $$Ws + w = \frac{Wb}{L} + Sx$$

$$\therefore P = F \tan \alpha + \frac{Wb}{L} + Sx$$

but $$F = uP$$

$$\therefore P = uP \tan \alpha + \frac{Wb}{L} + Sx$$

or (1) $$P = \frac{\frac{Wb}{L} + Sx}{1 - u \tan \alpha}$$

In the case when there is neither an upward or downward deflection of the front of the vehicle upon forward braking deceleration, i. e., when $x = 0$, $$P - \frac{Wb}{L} = u \frac{WH}{L}$$

or (2) $$P = \frac{W}{L}(b + uH)$$

so that combining (1) and (2)

$$\frac{W}{L}(b + uH)(1 - u \tan \alpha) = \frac{Wb}{L} + Sx$$

from which $$Sx = u\frac{WH}{L} - u \tan \alpha \left(\frac{Wb}{L} + u\frac{WH}{L}\right)$$

$$= u\left(\frac{WH}{L} - \tan \alpha \frac{Wb}{L} - \tan \alpha \frac{uWH}{L}\right)$$

(3) $$\therefore x = \frac{u}{S}\left(\frac{WH}{L}(1 - u \tan \alpha) - \tan \alpha \frac{Wb}{L}\right)$$

or $$\tan \alpha = \frac{\frac{uWH}{L} - Sx}{\frac{uWb}{L} + \frac{u^2 WH}{L}}$$

or $$\tan \alpha = \frac{H - \frac{SxL}{uW}}{b + uH}$$

or (4) $$\tan \alpha = \frac{1 - \frac{SxL}{uWH}}{\frac{b}{H} + u}$$

From Equation (4) it will be seen that since $\tan \alpha$ varies with $u$, no one given angle $\alpha$ will satisfy the requirement for neither upward nor downward deflection of the vehicle relatively to the road for all conditions of braking.

In the formulae, $u$ can be assumed positive in forward braking and negative in rearward braking. A positive value of $x$ will then represent "dive" of car and a negative value of $x$ will represent "lift" of car.

Applying the formulae to a specific example in which—

$S = 220$ (110# per inch per wheel)
$L = 112''$
$H = 25.5''$
$W = 3820$ lbs.
$b = 50''$ Assuming a maximum value of $u$ (the coefficient of rolling friction) equal to .8 which controls and represents the maximum possible deceleration obtainable (all wheels on the point of skidding) and that an angle $\alpha$ such that there is no upward or downward deflection of the front end of the vehicle is desired in forward braking.

$$x=0$$

and from Equation (4) in the example under consideration $$\tan \alpha = \frac{1-0}{\frac{50}{25.5}+.8}$$

$$=.362$$

and angle $\alpha = 20°$ approximately.

In rearward braking $u = -.8, x = 0$ $$\tan \alpha = \frac{1+0}{\frac{50}{25.5}-.8}$$

$$=.863$$

and angle $\alpha = 41°$ approximately.

When a fixed point on the wheel is deflected relatively to the vehicle in a vertical plane normal to the longitudinal axis of the vehicle so that the angle $$\alpha = 0°.$$

Then from equation (3)
In forward braking when $u = .8$ $$x = \frac{.8}{220}\left(\frac{3820 \times 25.5}{112}(1-0)-0\right)$$

$$= +3.16'' \text{ or } 3.16'' \text{ dive}$$

In rearward braking when $u = -.8$ $$x = -\frac{.8}{220}\left(\frac{3820 \times 25.5}{112}(1+0)-0\right)$$

$$= -3.16'' \text{ or } 3.16'' \text{ lift}$$

When the angle $\alpha = 20°$ ($\tan \alpha = .362$) and $u = .8$ from Equation (3) $x$ the deflection in rearward braking $= -1.8'' = 1.8''$ lift.

The deflection in forward braking of course is nil. Making the angle $\alpha = 20°$ has reduced the deflection in forward braking from 3.16" dive to nothing, and in rearward braking from 3.16" lift to 1.8" lift.

With the lower values of $u$ a lesser angle $\alpha$ will effect the desired reduction in the degree of dive or lift.

The following table shows approximately the manner in which the deflection $x$ (in inches) will change for different angles $\alpha$ in the given example—

| Angle $\alpha$ | Tan $\alpha$ | $x$ in forward braking | Deflection in forward braking | $x$ in rearward braking | Deflection in rearward braking |
|---|---|---|---|---|---|
| Degrees |  |  |  |  |  |
| 0 | 0 | +3.16 | 3.16" dive | −3.16 | 3.16" lift |
| 15 | .268 | +.822 | .822" dive | −2.18 | 2.18" lift |
| 20 | .362 | +.00 | .00" | −1.8 | 1.8" lift |
| 26½ | .5 | −1.335 | 1.335" lift | −1.2 | 1.2" lift |
| 35 | .7 | −3.2 | 3.2" lift | −.69 | .69" lift |
| 41 | .863 | −4.4 | 4.4" lift | −.00 | .00" |
| 45 | 1.00 | −5.6 | 5.6" lift | +.525 | .525" dive |

It will thus be seen that in forward braking the dive of the front end of the vehicle is reduced as the angle $\alpha$ is increased until at 20° the dive is nil. As the angle is further increased, there is increasing lift.

In rearward braking the lift of the front end of the vehicle is reduced as the angle $\alpha$ is increased until at 41° the lift is nil. As the angle is further increased there is increasing dive.

On cars of larger wheelbase and greater weight the required reduction in the deflection will occur with a lesser angle $\alpha$.

It will be apparent that the invention is equally applicable to the rear end of a vehicle in which case the pivot axes of the links of the rear wheels would be inclined downwardly towards the rear of the vehicle so that the rear wheels would move in a direction upwardly and rearwardly relatively to the vehicle upon being upwardly deflected relatively to the vehicle.

The formulae apply equally to the rear end of such a vehicle if $a$ is substituted for $b$ and if $u$ is assumed negative in forward braking and positive in rearward braking. As before, a positive value of $x$ will then represent "dive" of the rear end of the car and a negative value of $x$ will represent "lift" of the rear end of the car.

It will be obvious that leaf springs or the like, whose virtual pivot axis on the vehicle frame is inclined in accordance with the teachings of this invention, could replace the laterally extending links having physical pivot axes on the vehicle frame of this disclosure, without departing from the spirit of the invention.

I claim:—

1. In a vehicle having independent suspension, of a pair of road wheels at the front end of the vehicle, of which each road wheel is resiliently supported from the vehicle frame at the outer end of a laterally extending arm which is capable of pivotal swinging motion upwardly and downwardly in a plane transverse to the longitudinal axis of the vehicle, a pivot axis for the arm on the frame, inclined from the horizontal at an angle, downwardly and forwardly away from the vertical transverse plane of the center of gravity of the vehicle, whereby upon an upward deflection of the wheel relatively to the frame, an assumed fixed point on the wheel moves at an angle longitudinally of the vehicle in a direction forwardly and upwardly away from the vertical transverse plane of the center of gravity of the vehicle, and the spring deflections excited by braking forces are reduced.

2. In a vehicle having independent suspension, of a pair of road wheels at the front end of the vehicle, of which each road wheel is resiliently supported from the vehicle frame at the outer end of a laterally extending arm which is capable of pivotal swinging motion upwardly and downwardly in a plane transverse to the longitudinal axis of the vehicle, a pivot axis for the arm on the frame, inclined from the horizontal at an angle downwardly and forwardly away from the vertical transverse plane of the center of gravity of the vehicle, whereby the spring deflections excited by braking forces are reduced.

3. The combination, according to claim 2 in which each of the pair of road wheels is a dirigible wheel capable of pivoting about a normally substantially vertical axis at the end of the laterally extending arm and in which the pivot axis for the arm on the frame, is parallel to the normally vertical longitudinal mid-plane of the vehicle, whereby the caster angle of the dirigible road wheels remains constant regardless of the deflection of the road wheels relatively to the vehicle.

4. In a vehicle having independent suspension, of a pair of dirigible road wheels at the front end of the vehicle, of which each road wheel is mounted on a wheel support member which is pivotally mounted by ball joints between the outer ends of upper and lower laterally extending links which are capable of pivotal swinging motion upwardly and downwardly in planes transverse to the longitudinal axis of the vehicle, pivot axes for the said links, one above the other on the vehicle frame, parallel to each other and to the normally vertical longitudinal mid-plane of the vehicle and inclined at an angle downwardly and forwardly away from the vertical transverse plane of the center of gravity of the vehicle whereby the spring deflections excited by braking forces are reduced.

MAURICE OLLEY.